United States Patent [19]

Gentry

[11] 3,926,560
[45] Dec. 16, 1975

[54] SYSTEM FOR DETECTING GASEOUS CONTAMINANTS IN AIR

[75] Inventor: William O. Gentry, Oak Ridge, Tenn.

[73] Assignee: The United States of America as represented by the United States Energy Research and Development Administration, Washington, D.C.

[22] Filed: Oct. 30, 1973

[21] Appl. No.: 411,128

[52] U.S. Cl.............. 23/254 E; 23/232 E; 23/255 E; 73/23; 340/237 R
[51] Int. Cl.² .................. G01N 27/62; G01N 33/00; G08B 21/00
[58] Field of Search........... 23/254 E, 254 R, 255 E, 23/255 R, 232 E; 340/237 R; 73/339 R, 23, 421.5; 21/109

[56] References Cited
UNITED STATES PATENTS

| | | | |
|---|---|---|---|
| 2,702,471 | 2/1955 | Vonnegut............................ | 340/237 |
| 2,702,898 | 2/1955 | Meili et al............................ | 340/237 |
| 2,774,652 | 12/1956 | Vonnegut............................ | 23/255 R |
| 3,163,494 | 12/1964 | Kaye..................................... | 21/109 |
| 3,198,721 | 8/1965 | Rich...................................... | 23/255 R |
| 3,427,880 | 2/1969 | Grobel et al......................... | 73/339 |
| 3,522,431 | 8/1970 | Coffey et al. ....................... | 23/254 R |
| 3,674,435 | 7/1972 | Van Luik, Jr. et al............. | 23/254 R |
| 3,693,009 | 9/1972 | Sasaki.................................. | 250/389 |
| 3,751,969 | 8/1973 | Schrock .............................. | 23/254 E |

Primary Examiner—Barry S. Richman
Assistant Examiner—Dale Lovercheck
Attorney, Agent, or Firm—John A. Horan; David S. Zachry; Fred O. Lewis

[57] ABSTRACT

A system for detecting the presence in air of selected gaseous contaminants. The system includes an aerosol detector arranged to monitor the air including a first electrode and a second perforate electrode defining a chamber within which said first electrode is disposed and which is open to ambient atmosphere; a radioactive source for dissociating air molecules within said chamber; and a vapor emitter for introducing to the air a vapor selected to form an aerosol by chemical reaction with said gaseous contaminants.

10 Claims, 3 Drawing Figures 3,926,560

1

SYSTEM FOR DETECTING GASEOUS CONTAMINANTS IN AIR

BACKGROUND OF THE INVENTION

This invention was made in the course of, or under, a contract with the United States Atomic Energy Commission.

This invention relates generally to apparatus for the detection of a selected component of a gas mixture and more particularly to a system for the detection of selected gaseous contaminants in air, said system including an aerosol detector.

It is well known that ionization chambers or condensation nuclei detectors can be used to monitor air to give warning of the presence of particulates resulting from thermal decomposition or from combustion. For example, U.S. Pat. No. 2,702,898 to Meili et al describes in detail a smoke-detection system wherein an electrostatic field is established between the electrodes of an ionization chamber which is exposed to air. A radioactive source is provided to ionize the air in the chamber, and means are provided to give warning of the reduction in ion current flow which results from the presence of visible or invisible particles (e.g., smoke) in the air. Again, U.S. Pat. No. 3,427,880 to Grobel et al describes in detail the use of either an ionization chamber particle detector or a condensation nuclei detector to monitor gas which has been circulated through electrical machinery to cool the same. Overheating of the machinery decomposes a material coated thereon, generating submicron particles which are entrained in the cooling gas. If an ionization chamber is used for monitoring the cooling gas, the presence of the submicron particles is indicated by a decrease in ion current flow. If a condensation nuclei detector is employed, a sample of the cooling gas is humidified and then expanded, causing the water vapor to condense on any submicron particles present. The condensation in turn changes the amount of scattered light incident on a photo tube; as a result the output from the tube changes, indicating the presence of the submicron particles. Such methods of detection are effective because they are sensitive to the presence of the visible and invisible particles generated by decomposition or combustion. Unfortunately, such methods are unsuitable for the detection of gaseous contaminants not containing particulates—for example, gases such as hydrogen fluoride (HF), fluorine ($F_2$), sulfur dioxide ($SO_2$), and nitrogen dioxide ($NO_2$).

SUMMARY OF THE INVENTION

Accordingly, it is an object of this invention to provide a novel system for the detection of selected gaseous contaminants in air.

It is another object to provide a system wherein an aerosol detector—e.g., an ionization chamber particle detector or a condensation nuclei detector—can be used to detect the presence of certain nonparticulate gaseous contaminants.

It is another object to provide a system for giving warning of the presence in air of not only decomposition and combustion products but also selected gaseous contaminants substantially free of particulates.

This invention can be summarized as follows:

A system for indicating the presence of a selected gaseous contaminant in air comprising the combination of an aerosol detector for monitoring said air and a vapor emitter introducing to the air so monitored a vapor selected to form an aerosol by chemical reaction with said gaseous contaminant.

DESCRIPTION OF THE PREFERRED EMBODIMENT

This invention is applicable to the detection of various gaseous contaminants in wet or dry air. For brevity, however, it will be illustrated chiefly as applied to the detection of corrosive fluorine-containing gases in the atmosphere.

Figure 1:
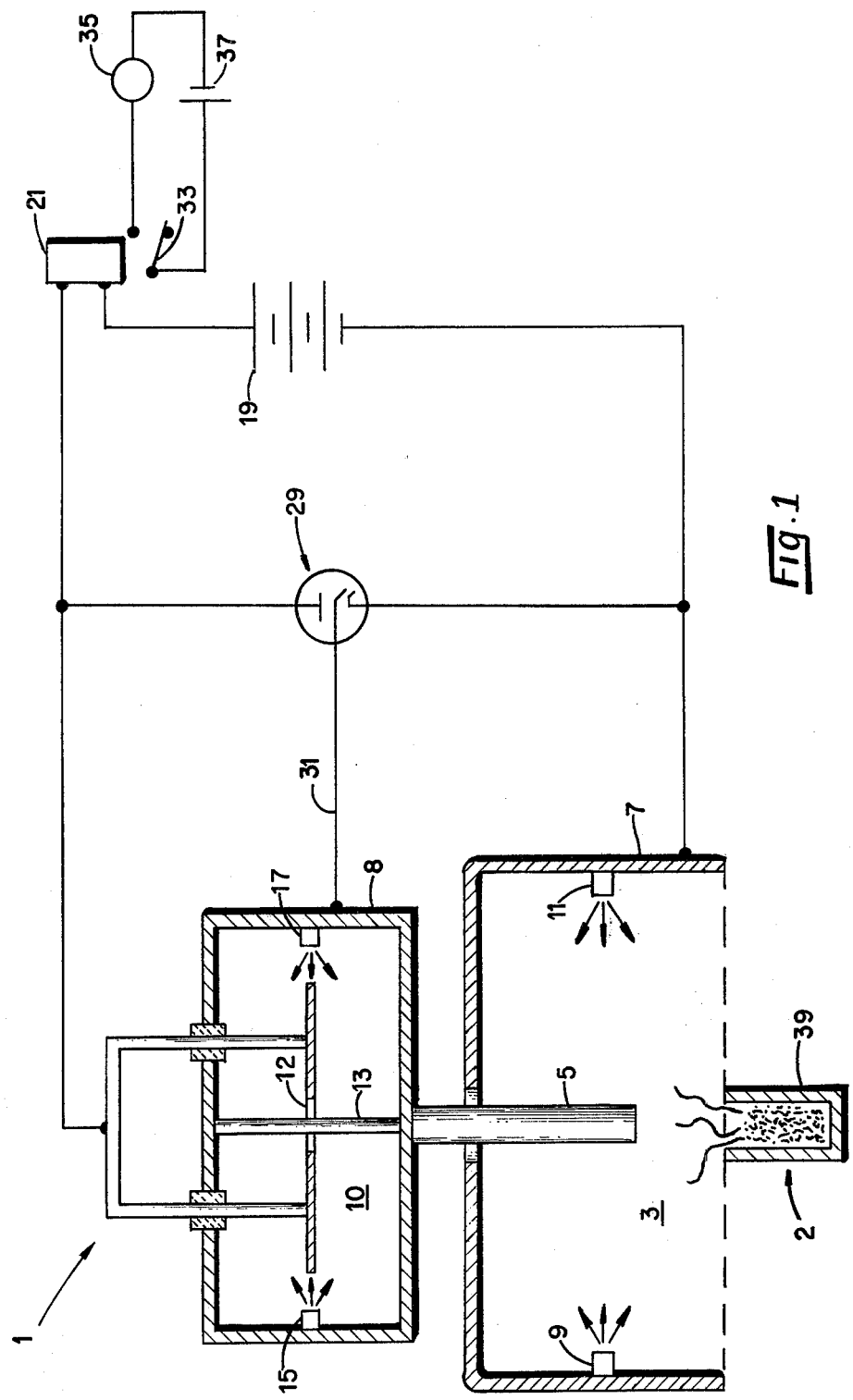
FIG. 1 is a schematic diagram of a conventional ionization chamber smoke detector as modified in accordance with this invention.

FIG. 1 illustrates one form of this invention as designed for the detection of HF in the atmosphere. The system includes a conventional aerosol detector 1 and a specially provided source 2 of a gaseous reagent, to be described hereinafter. The term "aerosol detector" is used herein to refer to means for indicating or otherwise giving warning of the presence of visible and/or invisible particles in the gas mixture of interest—e.g., air.

In the form shown in FIG. 1, the new detection system includes a pair of ionization chambers 3 and 10 and a circuit for operating the chambers and giving warning of the presence of HF in the atmosphere. The chamber 3, which serves as a sensing chamber, includes a central electrode 5 and a cylindrical outer electrode 7. The electrode 7 is formed with a metal screen portion, so that the interior of the sensing chamber is open to the atmosphere. Mounted within chamber 3 are sources 9 and 11 of ionizing radiation—e.g., alpha sources—for dissociating air molecules in the chamber into electrons and positive ions. The central electrode 5 extends through a port in the wall of cylinder 7, and the outer end of this electrode is connected to an impervious metal shell 8 enclosing a "reference" ionization chamber 10. The metal shell 8 and a central support post 13 combine to form the negative electrode of the reference chamber. The positive electrode is a circular plate 12 having an aperture at its center. The electrode 12 is insulated from the shell 8 and is positioned in the region between the portions 8, 13 of the negative electrode. The shell 8 enclosing chamber 10 is charged with particle-free air and is virtually isolated from the external atmosphere. This chamber contains alpha-radiation sources 15 and 17 for dissociating air molecules.

As shown, the outer electrode 7 of the sensing chamber 3 is connected to the negative side of a suitable d.c. power supply 19, whereas the plate electrode 12 of the reference chamber 10 is connected, through the actuating coil of a conventional electromagnetic relay 21, to the positive side of the supply. Thus, a potential is applied across the serially connected chambers 3 and 10. As a result, electrons and positive ions produced by the above-mentioned dissociation are attracted to the chamber electrodes, producing a very small current flow through the chambers. As is well known, the introduction of microscopic or submicroscopic particles into the sensing chamber 3 will produce a relatively abrupt decrease in the ionic flow therein—i.e., will produce an abrupt increase in the resistance of this chamber. The reference chamber 10 is designed to operate under saturated conditions and serves as a constant-current device with very high dynamic resistance. Thus, a relatively small increase in the resistance of chamber 3 due to particles in the atmosphere therein will be reflected in a relatively large change in the voltage at the junction (shell 8) of the chambers.

A commercially available gas-discharge triode 29, designed for operation with high-impedance ion chambers, has its anode connected to the reference chamber electrode 12 and its cathode connected to the cylinder 7. A starter electrode 31 of the tube is connected to a potential point common to the chambers, so that the potential maintained on the starter electrode 31 is dependent on the ion current through the chambers. If sufficient particles are introduced to the sensing chamber 3, the voltage between the starter electrode and the cathode increases to a selected value and a discharge takes place therebetween. This in turn triggers relatively heavy current flow between the cathode and the anode, actuating relay 21. Actuation of the relay closes a contact 33 connected in series with an electrical alarm 35 and a power supply 37, thus energizing the alarm.

In accordance with this invention as applied to detecting HF, a vapor emitter 2 is provided for continuously introducing a selected vapor into the sensing ionization chamber 3. The vapor so introduced is one which in the gaseous phase reacts with HF to form particles, thus forming an aerosol. The vapor emitter may, for example, be a molecular sieve material whose pores have been saturated with dibutylamine. In the arrangement shown, the saturated molecular sieve material is contained in an open-topped canister 39 which is mounted to the underside of the screen portion of the sensing-chamber electrode 7. Thus, dibutylamine vapor continuously flows from the canister into the sensing chamber. If HF is present in the atmosphere monitored by chamber 3, vapor from the canister reacts therewith to form an aerosol. Assuming a threshold concentration of HF, the resulting increase in the resistance of the sensing chamber energizes the alarm 35 as described above.

EXAMPLE I

A system of the kind shown in FIG. 1 was built and tested. The chambers 3, 10 and the tube 29 constituted a Model F-5B Pyr-A-Larm, manufactured by Pyrotronics, Inc., Cedar Knolls, N.J. The normal operating voltage applied across the series combination of the chambers was 220 volts d.c. The vapor emitter 2 was a canister (length, 2½ inches; diameter, ¾ inch) filled with a dibutylamine-saturated molecular sieve material (such as Type 3A Molecular Sieve, manufactured by Union Carbide Corporation, Linde Division, 270 Park Avenue, New York, N.Y.). The molecular sieve had been saturated by soaking it in liquid dibutylamine for 24 hours.

The system was mounted in a test chamber and tested by introducing various gaseous mixtures of HF and air to the chamber. Table I summarizes the results obtained.

TABLE I

| Run No. | HF in Air (ppm) | Response Time (sec.)* |
|---|---|---|
| 1 | 2 | 5 |
| 2 | 2 | 12 |
| 3 | 3.3 | 20 |
| 4 | 10 | 5 |

*Time in seconds between introduction of the sample to the test chamber and the sounding of the alarm. The sample was introduced at a point 6" from the detector.

Tests indicated that the vapor emitter generated vapor satisfactorily for detection purposes for approximately 30 days.

EXAMPLE II

The arrangement shown in FIG. 1 was modified by substituting a different vapor source. As shown in FIGS. 2 and 3, this source included a stainless steel reservoir 41 having a top outlet tube 43. The externally threaded tip of the outlet tube was inserted in an aperture in the base of the shell 7 of sensing chamber 3 and clamped thereto by means of nuts 45, 46. As shown in FIG. 3, the inner wall of the upper nut 45 was grooved for reception of an annular Teflon washer for sealing against the upper end of the tube 43. Fitted in the aperture of the washer was a porous glass rod, or evaporator, 51 which was positioned to extend within the sensing chamber and terminate just below the central electrode 5. The upper end of the wick 49 was wrapped around and secured to the base of the evaporator. The reservoir was filled with 60 grams of liquid dibutylamine, the liquid being introduced by means of a hypodermic needle inserted through a fine hole 53 in the tube 43. The wick conveyed liquid dibutylamine from the reservoir to the evaporator, from which the dibutylamine evaporated into the sensing chamber at a rate which could be varied by adjusting the amount of evaporator surface exposed to the chamber. The detection system operated satisfactorily as an HF detector for over 5 months at atmospheric temperature and pressure until the supply of dibutylamine essentially was exhausted. The average evaporation rate for the dibutylamine was about 0.4 gram/day. The following table illustrates the results obtained.

TABLE II

| Run No. | HF in Air (ppm) | Response Time (sec.) |
|---|---|---|
| 1 | 4 | 5 |
| 2 | 1 | 20 |
| 3 | .2 | 30 |
| 4 | 2 | 10 |
| 5 | 1 | 5 |

Additional tests established that the system utilizing a vapor emitter of the type illustrated in FIGS. 2 and 3 would give warning of 2–10 ppm $NO_2$ or $SO_2$ in air within 30 seconds.

The systems described above are merely illustrations of this invention. If desired, only one ionization chamber need be employed, as described in U.S. Pat. No. 3,693,009, to Sasaki. The particles can be sensed by means of a condensation nuclei detector of the kind described in above-referenced U.S. Pat. No. 3,427,880, or they can be sensed with any other suitable aerosol detector, such as a conventional gas stream monitor utilizing beta radiation. Ionization chambers are preferred, however, because of their convenience, their ability to operate continuously, and their high sensitivity, and because they do not require moving parts.

It is within the scope of this invention to detect the presence in the atmosphere of any gaseous contaminant selected from the group consisting of corrosive, fluorine-containing gases (for example: HF, $BrF_3$, and $F_2$) and gaseous pollutants such as $SO_2$, $NO_2$, and HCl. The vapor used for detection can be supplied by any volatile material which in the gas phase reacts with the corrosive gas or gaseous pollutant to form an aerosol. That is, the vapor used for detection can be selected on the basis of various reactions known in the art. For example, any amine derived from ammonia by the replacement of hydrogen with one or more univalent hydrocarbon radicals can be used in accordance with this invention for the detection of $SO_2$, $NO_2$, HCl, and corrosive fluorine-containing gases. Primary, secondary, and tertiary amines are especially suitable.

Figures 2, 3:
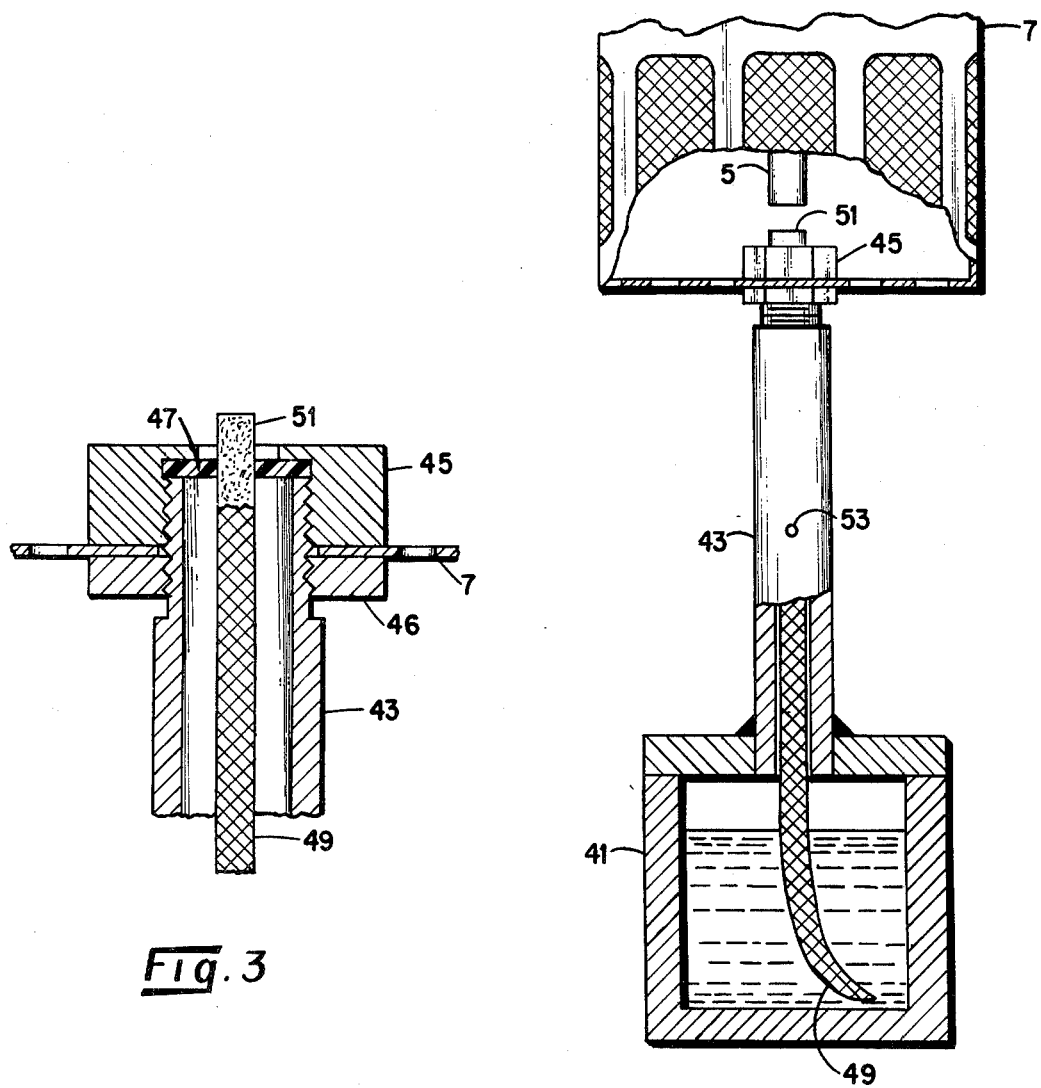
FIG. 2 is a schematic diagram of an alternative form of the vapor emitter 2 shown in FIG. 1.
FIG. 3 is a detail view (not to scale) of a wick-and-evaporator assembly shown in FIG. 2.

It will be apparent that detection systems designed in accordance with this invention have numerous applications. For instance, systems of the kind shown in FIGS. 1-3 can be used to advantage in plants for the production of $UF_6$ from $UO_3$ or $UO_2$. Such plants typically employ both gaseous HF and gaseous $F_2$ to effect the conversion to $UF_6$. Thus, the systems shown in the figures can be used to monitor the building atmosphere continuously for $F_2$ and HF, as well as gaseous products from thermal decomposition or combustion.

This invention has been illustrated herein as applied to the detection of gaseous contaminants such as $SO_2$, $NO_2$, HCl, and corrosive fluorine-containing gases. As indicated, the selection of a suitable vapor for forming an aerosol with such contaminants is within the skill of the art. In applications where the atmosphere is being monitored only for corrosive fluorine-containing gases, the vapor can, for example, be ammonium hydroxide, dimethylamine, or dibutylamine. Where $SO_2$ and $NO_2$ are the pollutants of interest, the vapor can, for example, be methylamine, dimethylamine, or dibutylamine. Vapors useful in the detection of HCl include dibutylamine, ammonium hydroxide, and ammonia. Other suitable vapors will be apparent to those versed in gas-phase reactions yielding solid products.

The vapor employed in accordance with this invention can be derived in any suitable manner from any suitable source. For example, the vapor can be generated by evaporation from a body of liquid, sublimation from the solid state, or volatilization of a material absorbed in or adsorbed on another material. If desired, the source may be heated to promote vaporization. Again, the vapor can be derived from a gas supply, as from a cylinder of gas under pressure. (The term "vapor" is used herein to refer to a substance in the gaseous state but below its critical temperature.) In those instances where the vapor is derived by volatilizing a sorbed material, preferably the material is sorbed on a high-surface-area substance, such as a molecular sieve or activated charcoal or alumina. Dibutylamine-containing reservoirs of the kind illustrated in FIG. 2 but not containing a wick assembly have been found to provide a sensitivity in the range of 25-100 ppm HF in air.

The vapor emitter 2 can be provided at any convenient location ensuring that vapor therefrom is introduced to the atmosphere being monitored by the aerosol detector. The emitter may be mounted to the aerosol detector, as described. Alternatively, it may be mounted in the vicinity thereof or even within the detector. In an arrangement where a sample of the atmosphere is conveyed to the detector through a duct, the emitter 2 may be mounted in the duct or near the inlet thereof, so that the resulting aerosol will be conveyed to the detector.

I claim:

1. A system for detecting the presence, in an air atmosphere, of particulate combustion products and a selected gaseous contaminant, said system comprising the combination of a first electrode and a second perforate electrode defining a chamber within which said first electrode is disposed and which is open to ambient atmosphere; a radioactive source for dissociating air molecules within said chamber; circuit means connected across said electrodes for establishing current flow therebetween when air molecules are dissociated within said chamber; and means for introducing to said chamber a vapor having the property of chemcially reacting with said gaseous contaminant to form particles.

2. A system for detecting the presence in air of particulate combustion products and a gaseous contaminant selected from the group consisting of $SO_2$, $NO_2$, HCl, HF, $BrF_3$, and $F_2$, said system comprising a particle detector having an first electrode and a second electrode, said second electrode forming a closed ionization chamber within which said first electrode is disposed, a radioactive source within said closed ionization chamber, a third electrode having an opening therein and surrounding an extension of said second electrode, said third electrode and said extension forming an ionization chamber which is open to ambient air, a radioactive source within the open ionization chamber for dissociating air molecules therein, and means for introducing to the interior of the open ionization chamber a vapor having the property of reacting chemically with said gaseous contaminant to form particles.

3. The system of claim 2 wherein said means includes a vessel containing a sorbent for a volatile liquid precursor of said vapor, said sorbent incorporating a selected sorbed quantity of said precursor.

4. The system of claim 2 wherein said means includes a vessel containing a sublimable solid precursor of said vapor.

5. The system of claim 2 wherein said means includes a vessel which contains a charge of said vapor at a pressure exceeding the pressure of said atmosphere.

6. The system of claim 2 wherein said means for introducing said vapor is carried by said particle detector.

7. The system of claim 2 wherein said means includes a vessel containing a volatile liquid precursor of said vapor.

8. The system of claim 7 wherein said means also includes a wick having an end immersed in said liquid.

9. The system of claim 8 wherein said wick extends from within said vessel into said sensing chamber.

10. The system of claim 8 wherein a portion of said wick is in liquid-transfer contact with a rigid porous member extending into said sensing chamber.

* * * * *